US012196340B2

(12) United States Patent
Melancon et al.

(10) Patent No.: US 12,196,340 B2
(45) Date of Patent: Jan. 14, 2025

(54) RADIALLY EXPANDABLE LOCKS FOR VALVE SYSTEMS

(71) Applicant: National Oilwell Varco, L.P., Houston, TX (US)

(72) Inventors: Jeffrey Thomas Melancon, Huntsville, TX (US); Wade Ernest Sheppard, Huntsville, TX (US)

(73) Assignee: National Oilwell Varco, L.P., Houston, TX (US)

( * ) Notice: Subject to any disclaimer, the term of this patent is extended or adjusted under 35 U.S.C. 154(b) by 174 days.

(21) Appl. No.: 17/951,235

(22) Filed: Sep. 23, 2022

(65) Prior Publication Data

US 2023/0092113 A1    Mar. 23, 2023

Related U.S. Application Data

(60) Provisional application No. 63/247,357, filed on Sep. 23, 2021.

(51) Int. Cl.
    *F16K 35/02* (2006.01)
(52) U.S. Cl.
    CPC ................ *F16K 35/022* (2013.01)
(58) Field of Classification Search
    CPC . F16K 35/022; F15B 15/261; F15B 2015/268
    USPC .................................... 251/1.3, 93
    See application file for complete search history.

(56) References Cited

U.S. PATENT DOCUMENTS

| 1,512,837 | A | * | 10/1924 | Evenden ................ B66F 3/247 |
| | | | | 254/93 HP |
| 4,305,565 | A | | 12/1981 | Abbe |
| 5,056,418 | A | | 10/1991 | Granger et al. |
| 5,575,452 | A | | 11/1996 | Whitby et al. |
| 5,918,851 | A | | 7/1999 | Whitby |
| 2006/0169933 | A1 | | 8/2006 | Le |

(Continued)

FOREIGN PATENT DOCUMENTS

DE    3317487 A1    11/1984

OTHER PUBLICATIONS

UKIPO Examination Report dated Jan. 4, 2024, for Application No. GB2213938.0.

(Continued)

*Primary Examiner* — Kenneth Rinehart
*Assistant Examiner* — Nicole Gardner
(74) *Attorney, Agent, or Firm* — Conley Rose, P.C.

(57) ABSTRACT

A valve lock for a linear valve system includes a housing including a passage configured to receive a rod of a linearly extendable valve member of the linear valve system, and a collet assembly received in the housing, wherein the collet assembly has a central axis extending parallel the rod of the valve member, a radially inner configuration with respect to the central axis of the collet assembly, and a radially outer configuration relative to the central axis of the collet assembly, wherein the lock includes an unlocked configuration associated with the radially outer configuration of the collet assembly, and a locked configuration associated with the radially inner configuration of the collet assembly and which locks against the rod of the valve member and thereby prevent the rod from travelling in at least one axial direction.

20 Claims, 8 Drawing Sheets

(56) References Cited

U.S. PATENT DOCUMENTS

2015/0053421 A1\* 2/2015 Tips ........................ E21B 34/10
166/375

OTHER PUBLICATIONS

UKIPO Search Report dated Mar. 14, 2023, for Application No. GB2213938.0.

\* cited by examiner

RADIALLY EXPANDABLE LOCKS FOR VALVE SYSTEMS

CROSS-REFERENCE TO RELATED APPLICATIONS

The present application claims benefit of U.S. provisional patent application No. 63/247,357 filed Sep. 23, 2021, and entitled "Radially Expandable Locks for Valve Systems", which is incorporated herein by reference in its entirety.

STATEMENT REGARDING FEDERALLY SPONSORED RESEARCH OR DEVELOPMENT

Not applicable.

BACKGROUND

Valve systems are utilized in myriad industrial applications for selectably controlling the flow of fluids through fluid conduits. As an example, valve systems are utilized in the drilling and completion of wellbores which extend through subterranean earthen formations. Particularly, valve systems may be utilized to control the flow of fluids and/or other materials from the wellbore. For instance, specialized valve systems referred to as blowout preventers (BOPs) are often utilized to prevent an inadvertent and uncontrolled release of fluids from the wellbore.

Valve systems include linear valve systems in which a valve member (e.g., a gate, a ram, etc.) is linearly displaced between a closed position restricting fluid flow across the linear valve system, and an open position permitting fluid flow across the linear valve system. In some valve systems, the valve member may be actuated manually by an operator of the valve system. However, in other valve systems the valve member may be displaced in response to, for example, the selective application of fluid pressure, the application of a biasing force, and/or the activation of an electric motor, etc. Additionally, in some applications, the valve system may include a lock to prevent the valve member of the valve system from inadvertently actuating from the closed position and thereby opening the valve.

SUMMARY

An embodiment of a valve lock for a linear valve system comprises a housing comprising a passage configured to receive a rod of a linearly extendable valve member of the linear valve system, and a collet assembly received in the housing, wherein the collet assembly has a central axis extending parallel the rod of the valve member, a radially inner configuration with respect to the central axis of the collet assembly, and a radially outer configuration relative to the central axis of the collet assembly, wherein the lock comprises an unlocked configuration associated with the radially outer configuration of the collet assembly, and a locked configuration associated with the radially inner configuration of the collet assembly and which locks against the rod of the valve member and thereby prevent the rod from travelling in at least one axial direction. In some embodiments, the valve lock comprises a piston assembly received in the housing and configured to actuate the collet assembly into the radially outer configuration. In some embodiments, the piston assembly comprises a piston comprising a first position in the housing and a second position in the housing axially spaced from the first position, wherein the first position of the piston corresponds to the locked configuration of the collet assembly while the second position of the piston corresponds to the unlocked configuration of the collet assembly. In certain embodiments, the piston assembly comprises a biasing member configured to bias the piston towards the first position, and a piston chamber configured to receive pressurized hydraulic fluid thereby forcing the piston into the second position. In certain embodiments, the collet assembly comprises a plurality of wedges spaced circumferentially about the central axis of the collet assembly, wherein each wedge comprises a radially inner position corresponding to the radially inner configuration of the collet assembly and a radially outer position corresponding to the radially outer configuration of the collet assembly. In some embodiments, each of the wedges comprises an inclined engagement surface positioned at an acute angle relative to the central axis of the collet assembly. In some embodiments, the valve system comprises an open configuration corresponding to a first axial position of the valve member and a closed configuration corresponding to a separate second axial position of the valve member, and wherein the valve lock is configured to lock the valve system into the closed configuration.

An embodiment of a valve lock for a linear valve system comprises a housing comprising a passage configured to receive a rod of a linearly extendable valve member of the linear valve system, and a collet assembly received in the housing, wherein the collet assembly comprises a plurality of circumferentially spaced wedges each having a radially inner position relative to a central axis of the lock, and a radially outer position relative to the lock, wherein the lock comprises an unlocked configuration associated with the radially outer positions of the wedges of the collet assembly, and a locked configuration associated with the radially inner positions of the wedges of the collet assembly and which locks against the rod of the valve member and thereby prevent the rod from travelling in at least one axial direction. In some embodiments, the valve lock comprises a piston assembly received in the housing and configured to actuate the wedges of the collet assembly into their radially outer positions. In some embodiments, the valve system comprises an open configuration corresponding to a first axial position of the valve member and a closed configuration corresponding to a separate second axial position of the valve member, and wherein the valve lock is configured to lock the valve system into the closed configuration. In certain embodiments, each of the wedges comprises an inclined engagement surface positioned at an acute angle relative to the central axis of the collet assembly. In certain embodiments, each of the wedges comprises a shoulder configured to physically engage a retainer of the rod of the valve member whereby relative axial movement between the plurality of wedges and the rod of the valve member in the at least one axial direction is restricted. In some embodiments, the valve lock comprises a plurality of biasing members configured to urge the plurality of wedges towards their radially inner positions. In some embodiments, the valve system comprises an open configuration corresponding to a first axial position of the valve member and a closed configuration corresponding to a separate second axial position of the valve member, and wherein the valve lock is configured to lock the valve system into the closed configuration.

An embodiment of a valve lock for a linear valve system comprises a housing comprising a passage configured to receive a rod of a linearly extendable valve member of the linear valve system, a collet assembly received in the housing, wherein the collet assembly has a central axis extending parallel the rod of the valve member, a first configuration with respect to the central axis of the collet assembly, and a second configuration relative to the central axis of the collet assembly, and wherein the collet assembly is configurated to actuate from the first configuration to the second configuration in response to physical engagement between the rod of the valve member and the collet assembly, a piston assembly received in the housing and configured to actuate the collet assembly into the second configuration, wherein the lock comprises an unlocked configuration associated with the second configuration of the collet assembly, and a locked configuration associated with the first configuration of the collet assembly and which locks against the rod of the valve member and thereby prevent the rod from travelling in at least one axial direction. In some embodiments, the valve lock comprises a piston assembly received in the housing and configured to actuate the collet assembly into the second configuration. In some embodiments, the piston assembly comprises a piston comprising a first position in the housing and a second position in the housing axially spaced from the first position, wherein the first position of the piston corresponds to the first configuration of the collet assembly while the second position of the piston corresponds to the second configuration of the collet assembly. In certain embodiments, the collet assembly comprises a plurality of wedges spaced circumferentially about the central axis of the collet assembly, wherein each wedge comprises a radially inner position corresponding to the first configuration of the collet assembly and a radially outer position corresponding to the second configuration of the collet assembly. In certain embodiments, each of the wedges comprises an inclined engagement surface positioned at an acute angle relative to the central axis of the collet assembly. In some embodiments, each of the wedges comprises a shoulder configured to physically engage a retainer of the rod of the valve member whereby relative axial movement between the plurality of wedges and the rod of the valve member in the at least one axial direction is restricted. In some embodiments, the valve system comprises an open configuration corresponding to a first axial position of the valve member and a closed configuration corresponding to a separate second axial position of the valve member, and wherein the valve lock is configured to lock the valve system into the closed configuration.

BRIEF DESCRIPTION OF THE DRAWINGS

For a detailed description of exemplary embodiments of the disclosure, reference will now be made to the accompanying drawings in which.

DETAILED DESCRIPTION

Figure 1:
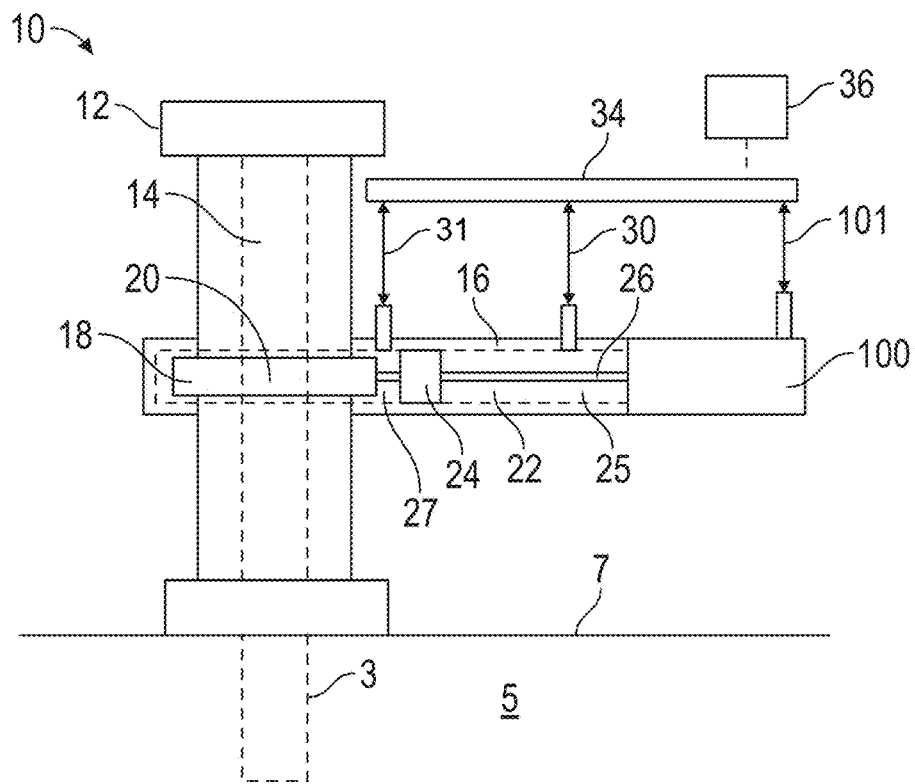
FIG. 1 is a schematic view of an embodiment of a valve system in an open configuration.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation.

As described above, valve systems, which include linear valve systems, are utilized to selectably control the flow of fluid through a fluid conduit by actuating a valve member between an open position and a closed position. Some valve systems may be powered (e.g., electrically, hydraulically, pneumatically, etc.) rather than manually operated. Additionally, some valve systems include locks configured to lock a valve member of the valve system into either an open position or a closed position preventing an actuator of the valve system from actuating the valve until the lock is placed into an unlocked configuration. For example, valve systems may include a lock configured to prevent a valve member from inadvertently actuating from the closed position into the open position (e.g., due to creep or for some other reason) whereby an inadvertent leak of fluid could occur across the valve system.

Locks for valve systems are typically powered, such as by hydraulics, between locked and unlocked configurations. For example, conventional locks may have an open circuit configured to convey hydraulic pressure to the lock to thereby actuate the lock from the locked configuration to the unlocked configuration, and a separate closed circuit configured to convey hydraulic pressure to the lock to thereby actuate the lock from the unlocked configuration to the locked configuration. Thus, at least some conventional locks do not lock automatically when the valve member of the valve system is actuated into the closed position. The lack of automatic locking may complicate the design of the valve system by requiring the addition of another hydraulic circuit (the closed circuit of the lock) to actuate the lock from the unlocked configuration to the locked configuration. The addition of a closed circuit also increases the complexity of operating the valve as an addition action must be taken (pressurizing the closed circuit of the lock) to lock the valve member of the valve system into the closed position, increasing the potential for operator error when operating the valve system. Additionally, while conventional locks include an automatic locking feature in which a single hydraulic circuit may both actuate the valve member of the valve system from the open position to the closed position and actuate the lock of the valve system form the unlocked configuration to the locked configuration. However, conventional automatic locks typically rely on a ball valve which may become stuck during the service life of the valve system, thereby preventing the lock from actuating into the locked configuration entirely.

Accordingly, embodiments disclosed herein include valve systems comprising valve locks configured to automatically lock the valve system into a closed configuration without the need to activate an additional, locking hydraulic circuit of the valve system. Instead, an operator (and/or a control system of the valve system) of the valve system need only actuate the valve system from an open configuration into the closed configuration in order to lock the valve system into the closed configuration by the valve lock. Once locked, the valve system cannot be returned to the open configuration until a hydraulic opening circuit coupled to the valve lock has been pressurized to thereby unlock the valve lock and thereby permit the operator to actuate the valve system into the open position by applying pressure to a separate hydraulic opening circuit of the valve system. This may prevent the inadvertent reopening of the valve system while preventing or mitigating potential issues in closing the valve system and locking it into the closed configuration.

Moreover, embodiments of valve locks described herein may automatically actuate into a locked configuration in response to the closure of the valve system without the need of a ball valve or other device which may be prone to failure during the operational life of the valve lock. Instead, a biasing member in conjunction with an inclined engagement surface of a collet assembly of the valve lock may be utilized to automatically actuate the valve lock into the locked configuration to thereby secure the valve system in the locked configuration.

Figure 2:
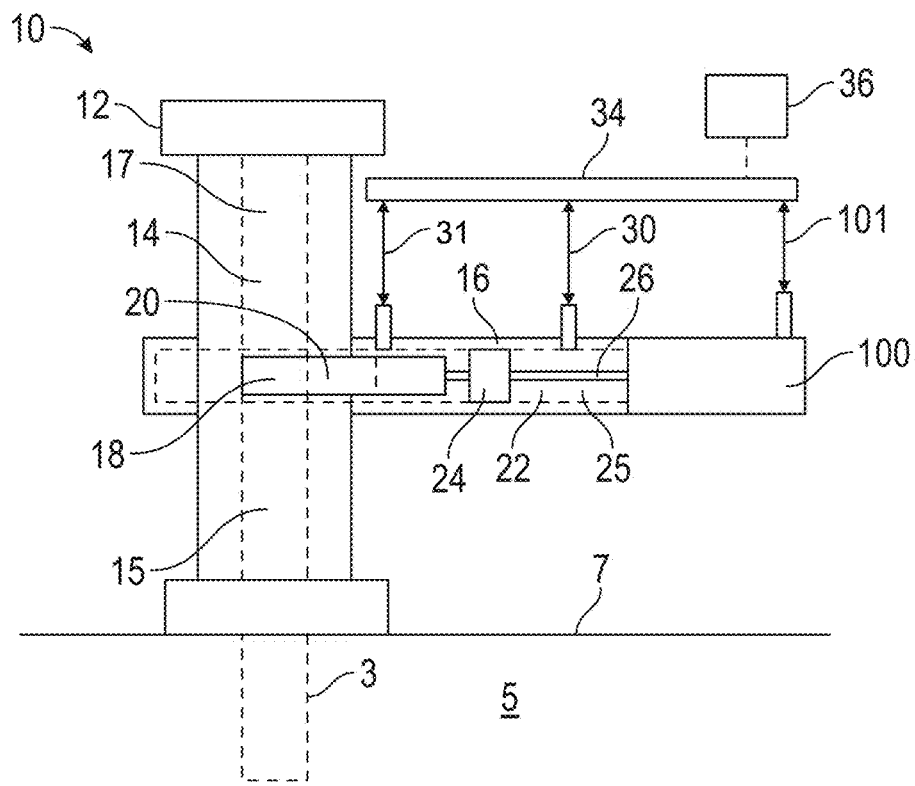
FIG. 2 is a schematic view of the valve system of FIG. 2 in a closed configuration.

Referring to FIGS. 1, 2, an embodiment of a valve system 10 is shown. In this exemplary embodiment, valve system 10 is generally configured to selectably isolate or seal a wellbore 3 extending through a subterranean earthen formation 5 from the ambient environment surrounding valve system 10. Thus, valve system 10 may comprise a component of a well system, such as an offshore well system in which valve system 10 is positioned subsea near a sea floor 7. In some embodiments, valve system 10 may comprise a BOP or other piece of well control equipment; however, in other embodiments the configuration of valve system 10 may vary. For instance, valve system 10 may comprise a gate valve or any other type of linearly actuated valve. Additionally, valve system 10 may be utilized in applications different from well systems in other embodiments.

In this exemplary embodiment, valve system 10 generally includes a valve housing 12 comprising a central passage 14 extending therethrough, a valve bonnet 16 extending laterally from the valve housing 12, a valve member 18 positionable within the central passage 14 of the valve housing 12, and a valve lock 100 configured to selectably lock the position of valve member 18. When valve system 10 is in an open configuration, fluids and/or other materials may be conveyed between wellbore 3 and other equipment connected to valve system 10 via central passage 14 of valve housing 12.

Valve member 18 of valve system 10 includes an open position (shown in FIG. 1) corresponding to the open configuration of valve system 10, and a closed position (shown in FIG. 2) corresponding to the closed configuration of valve system 10 that is spaced along a central axis of the valve member 18. Valve member 18 comprises a valve opening or passage 20 which is aligned and in fluid communication with the central passage 14 of valve housing 12 when valve member 18 is in the open position. Conversely, valve opening 20 or passage is offset from central passage 14 and valve member 18 seals central passage 14 when valve member 18 is in the closed position, thereby sealing or isolating a first portion 15 of central passage 14 from a second portion 17 of central passage 14 (valve member 18 being positioned between the first and second portions 15, 17). In this exemplary embodiment, valve member 18 comprises a valve gate; however, in other embodiments, the configuration of valve member 18 may vary. For example, in other embodiments, valve member 18 may comprise a ram (e.g., a blind ram, a shear ram, etc.) of a BOP.

In this exemplary embodiment, valve bonnet 16 comprises a valve passage 22 in which valve member 18 may be partially received when in the closed position. Additionally, in this exemplary embodiment, the valve member 18 is coupled to a piston 24 and comprises a tail rod 26 each of which are received in the valve passage 22 of valve member 18 and which travel in concert with valve member 18. Particularly, piston 24 is sealably received within valve passage 22 whereby piston 24 divides valve passage 22 into a first or opening chamber 25 and a second or closing chamber 27 that is sealed from the opening chamber 25 by the piston 24. Opening chamber 25 is in fluid communication with an opening hydraulic circuit 30 of valve system 10 while closing chamber 27 is in fluid communication with a second or closing hydraulic circuit 31 of valve system 10. Each fluid circuit 30, 31 may comprise a port connected to valve bonnet 16, and one or more fluid conduits extending from the port. Additionally, each fluid circuit 30, 31 is connected to a pressurized hydraulic source 34 which may selectably pressurize each hydraulic circuit 30, 31 as controlled by a control system 36 of the valve system 10.

For example, control system 36 may actuate valve system 10 from the open configuration shown in FIG. 1 to the closed configuration shown in FIG. 2 by applying hydraulic pressure from hydraulic source 34 to the closing chamber 27 while venting the opening chamber 25. In this manner, a hydraulic closing force is applied to piston 24, thereby displacing valve member 18 (connected to piston 24) from the open position to the closed position. Conversely, control system 36 may actuate valve system 10 (e.g., in response to a command provided by an operator of valve system 10, for example) from the closed configuration to the open configuration by applying hydraulic pressure from hydraulic source 34 to the opening chamber 25 while venting the closing chamber 27. In this manner, a hydraulic opening force is applied to piston 24, thereby displacing valve member 18 (connected to piston 24) from the closed position to the open position. In other embodiments, the actuation of valve member 18 between the open and closed positions may be accomplished by means other than hydraulic force, such as via a biasing member, a pneumatic piston or actuator, and/or an electrically powered actuator.

Valve lock 100 of valve system 10 is configured to lock valve member 18 into the closed position such that valve member 18 may not inadvertently escape from the closed position and open the valve system 10. For example, valve lock 100 may maintain valve member 18 in the closed position even should pressure within closing chamber 27 be lost due to a leak in the closing circuit 31 or some other malfunction of valve system 10. Additionally, as will be described further herein, valve lock 100 is configured to lock the valve member 18 into the closed position automatically without the need of an additional hydraulic circuit 101 configured to actuate the valve lock 100 into a locked configuration. Instead, in this exemplary embodiment, valve lock 100 includes only an unlocking hydraulic circuit 101 similarly comprising one or more fluid conduits connected to hydraulic source 34 whereby hydraulic pressure may be selectably applied to valve lock 100 as controlled by the control system 36. For example, control system 36 may apply hydraulic pressure from hydraulic source 34 to the valve lock 100 to actuate the valve lock 100 from the locked configuration to the unlocked configuration. Once in the unlocked configuration, control system 36 may apply hydraulic pressure to the opening chamber 25 of valve system 10 to displace the valve member 18 from the closed position to the open position.

Figure 3:
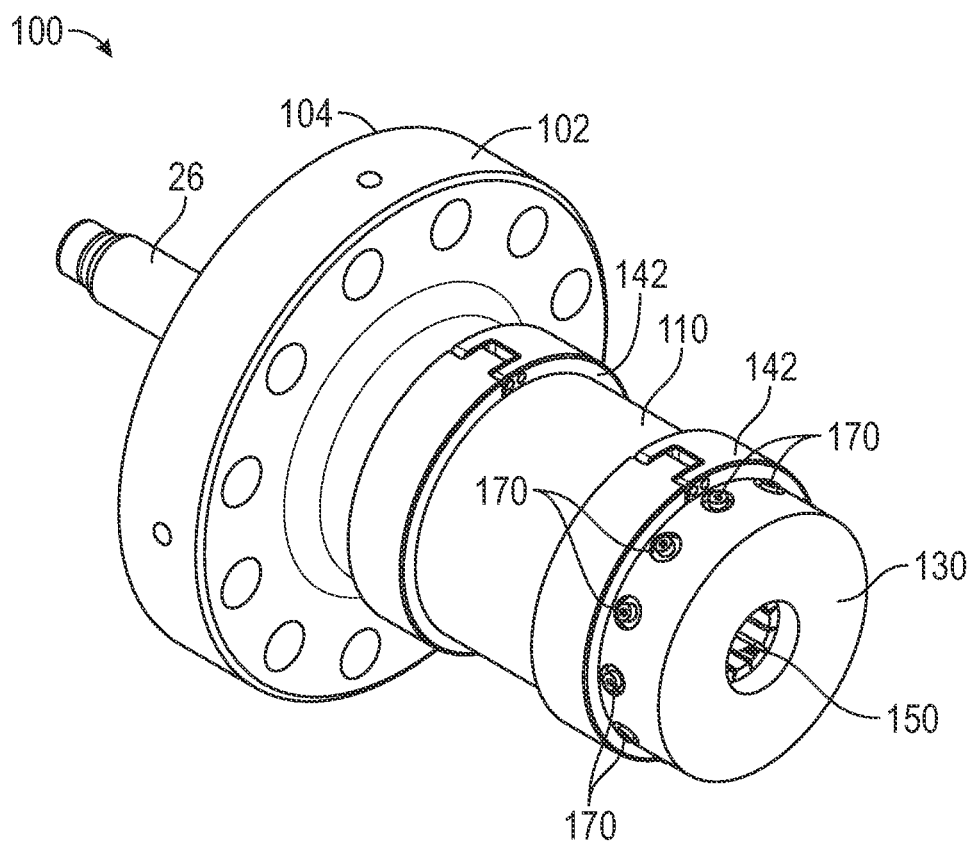
FIG. 3 is a perspective view of an embodiment of a valve lock of the valve system of FIG. 1.
Figure 4:
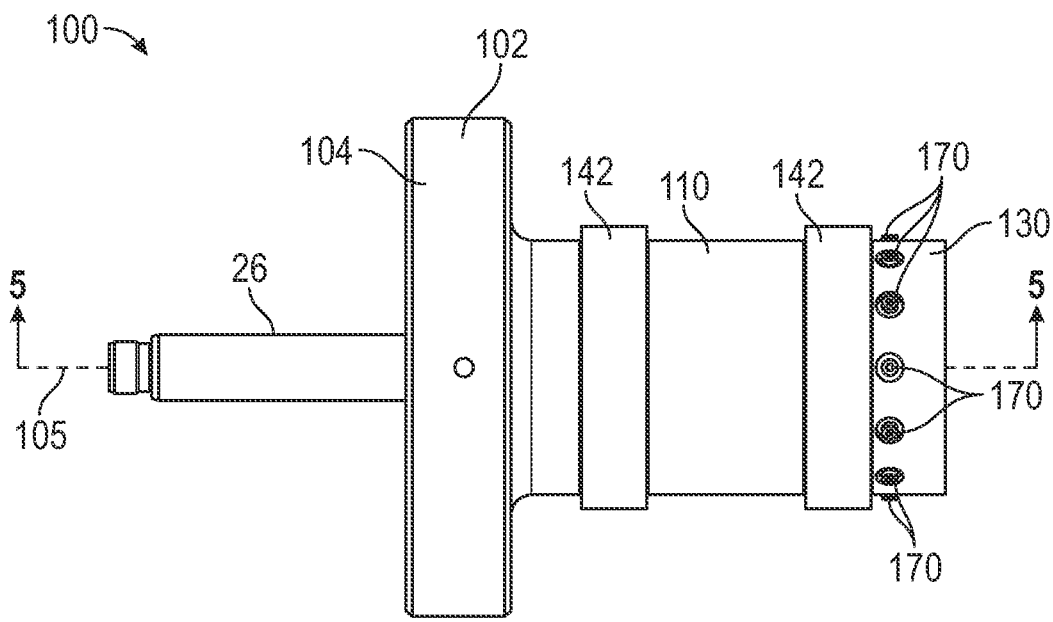
FIG. 4 is a side view of the valve lock of FIG. 3.
Figure 5:
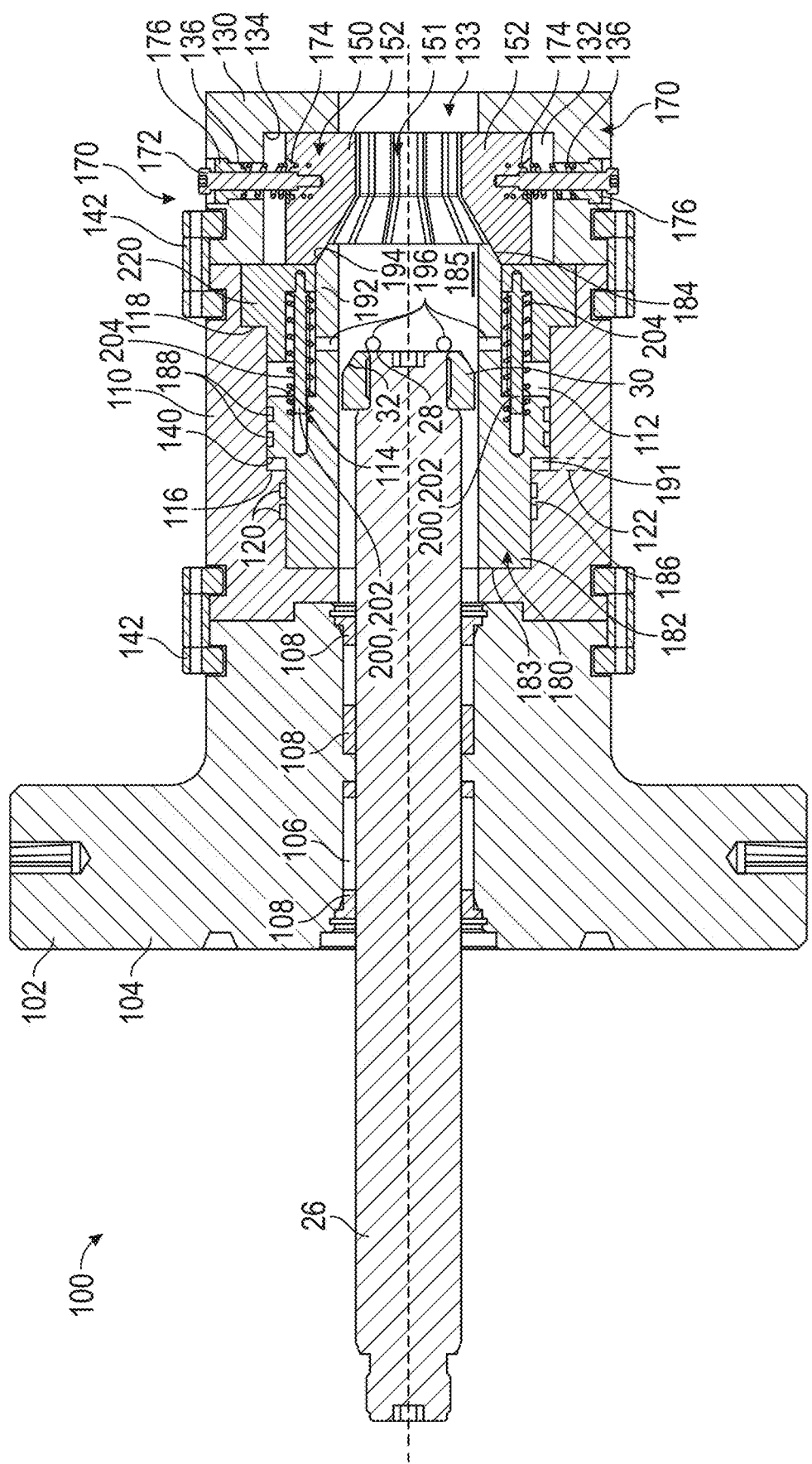
FIG. 5 is a cross-sectional view along lines 5-5 of FIG. 4 of the valve lock of FIG. 3.

Referring to FIGS. 3-5, an embodiment of the valve lock 100 of valve system 10 of FIGS. 1, 2, is shown in FIGS. 3-5. As will be described further herein, valve lock 100 is configured to lock the valve system 10 into the closed configuration. Although valve lock 100 is shown in FIGS. 1, 2 as a component of valve system 10, in other embodiments, valve lock 100 may comprise a component of valve systems which vary in configuration from the valve system 10 shown in FIGS. 1, 2. In this exemplary embodiment, valve lock 100 has a central or longitudinal axis 105 and generally includes a case or housing assembly 102, a collet assembly 150, and a piston assembly 180. For reference, a portion of the tail rod 26 of valve system 10 is shown in FIGS. 3-5 in order to illustrate how tail rod 26 interacts with the components of valve lock 100. In this exemplary embodiment, central axis 105 of valve lock 100 is coaxial with a central or longitudinal axis of the tail rod 26 of valve member 18. Thus, central axis 105 may also be referred to herein as the central axis 105 of valve member 18.

Housing assembly 102 generally includes a hub 104, an intermediate housing 110, and an outer housing 130. Hub 102 is configured to couple against the valve housing 14 of valve system 10 (e.g., via one or more fasteners) and includes a central passage 106. Tail rod 26 is receivable within the central passage 106 of hub 102. Additionally, hub 102 includes one or more annular bushings 108 located within the central passage 106 thereof. Bushings 108 centralize tail rod 26 within housing assembly 102 whereby tail rod 26 extends along and is centered about the central axis 105 of valve lock 100.

The intermediate housing 110 of housing assembly 102 is positioned between hub 204 and outer housing 130 and includes a central opening 112 defined by a generally cylindrical inner surface 114. Piston assembly 180 is received within the intermediate housing 110. The inner surface 114 of intermediate housing comprises a pair of annular shoulders 116, 118 spaced therealong. Additionally, an annular seal assembly 120 (e.g., one or more O-rings or other type of annular seal) is positioned on the inner surface 114. Intermediate housing 110 additionally includes a radial port 122 extending entirely through the intermediate housing 110 and in fluid communication with the central opening 112 thereof. Radial port 122 may comprise a component of the unlocking hydraulic circuit 101 described above.

The outer housing 130 of housing assembly 102 includes a central opening 112 in which the collet assembly 150 is received. In this exemplary embodiment, outer housing 130 includes a central passage 133, and an inner surface comprising an annular shoulder 134 located proximal an outer end of outer housing 130. Additionally, outer housing 130 includes a plurality of circumferentially spaced radial apertures 136 each extending entirely through the outer housing 130.

In this exemplary embodiment, the hub 102 and housings 110, 130 of housing assembly 104 are coupled together by releasable clamps 142 coupled about the outer surfaces of hub 102 and housings 110, 130. In other embodiments, the hub 102 and housings 110, 130 of housing assembly 104 may be coupled together in a different matter (e.g., via one or more threaded fasteners, etc.). In other embodiments hub 102 and housings 110, 130 may be permanently coupled together via welding, for example. In still other embodiments, hub 102, and housings 110, 130 may be formed monolithically or integrally together as a singular housing. Thus, housing assembly 102 may also be referred to herein as housing 102.

Figure 6:
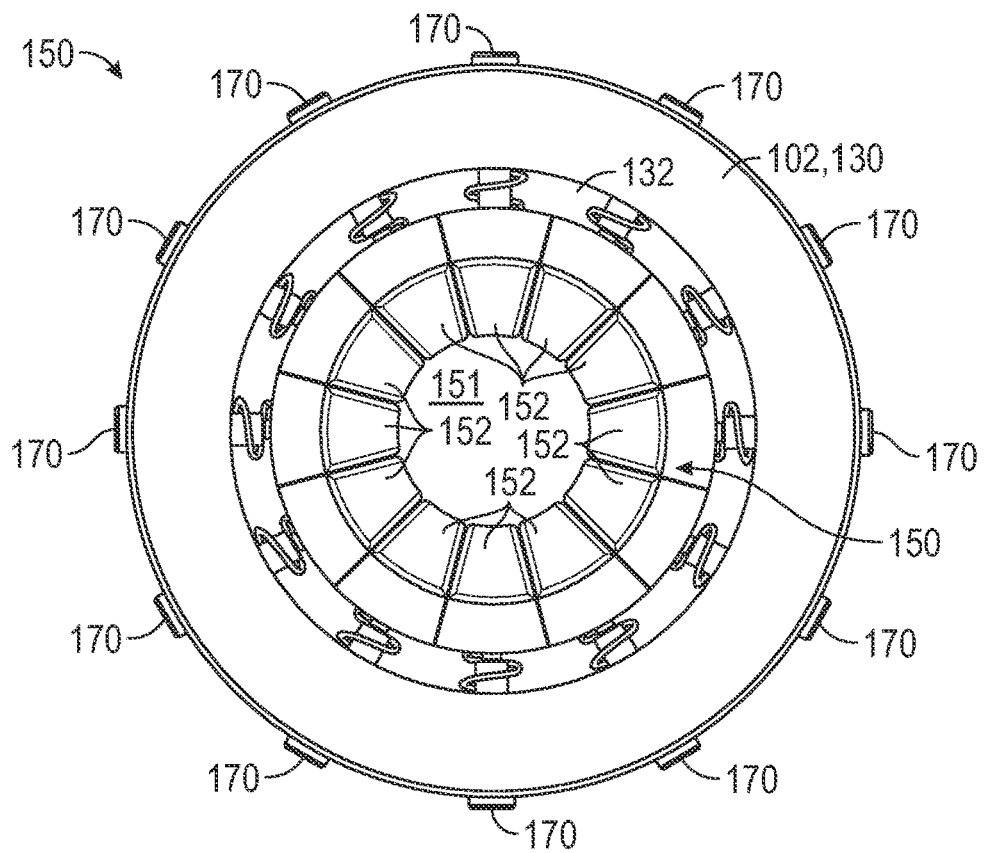
FIG. 6 is a front view of an embodiment of a collet assembly of the valve lock of FIG. 3.
Figure 7:
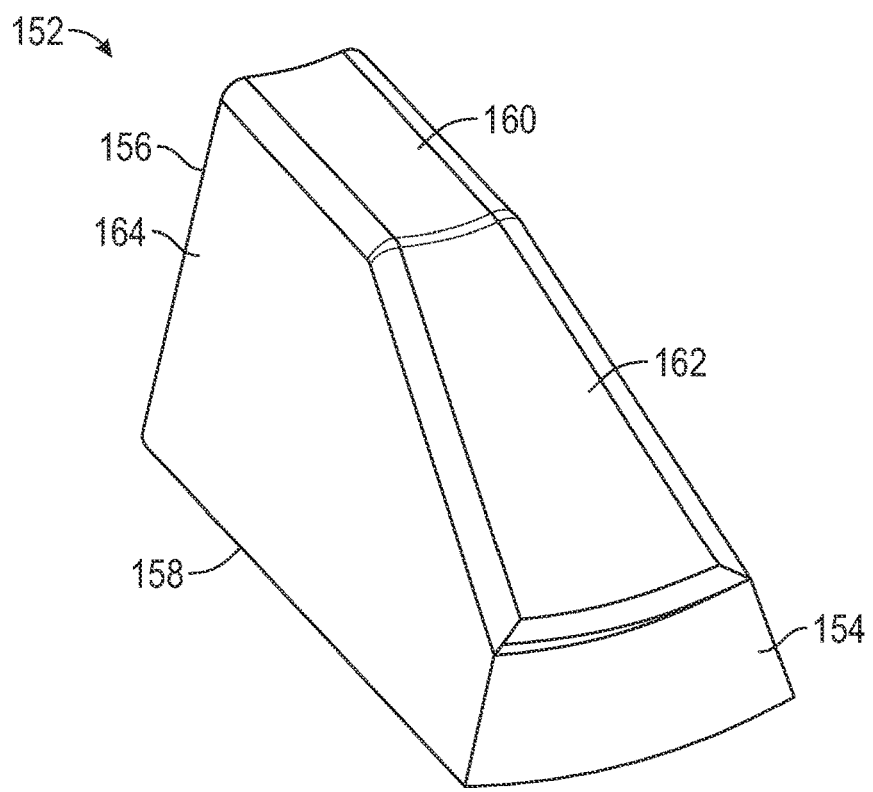
FIG. 7 is a perspective view of an embodiment of a wedge of the collet assembly of FIG. 6.

Referring now to FIGS. 3-7, additional views of the collet assembly 150 of valve lock 100 are shown in FIGS. 6, 7. Collet assembly 150 is configured to radially expand and contract relative to central axis 105 of valve lock 100 to actuate valve lock 100 between locked and unlocked configurations. Thus, collet assembly 150 may also be referred to herein as locking assembly 150. In this exemplary embodiment, collet assembly 150 comprises a central passage 151, and a plurality of circumferentially spaced locking members or wedges 152 and a plurality of corresponding circumferentially spaced retention assemblies 170. Collet assembly 150 comprises a central or longitudinal axis that is coaxial with central axis 105 of valve lock 100. In this configuration, collet assembly 150 extends circumferentially about central axis 105 with axis 105 extending centrally therethrough. Given that collet assembly 150 extends coaxially with central axis 105, central axis 105 may also be referred to herein as the central axis 105 of collet assembly 150.

As shown particularly in FIG. 7, each wedge 152 of collet assembly 150 comprises a longitudinal first end 154, a longitudinal second end 156 opposite first end 154, an arcuate outer surface 158 extending between ends 154, 156, and an arcuate inner surface 160 also extending between ends 154, 156. In this exemplary embodiment, the inner surface 160 of each wedge 152 comprises an inclined surface 162 extending from the first end 154 thereof. Inclined surface 162 extends at a non-zero, non-orthogonal angle (e.g., any angle greater than zero degrees and less than ninety degrees) relative to the central axis 105 of valve lock 100. The second end 156 of each wedge 152 defines an orthogonal surface or shoulder 164 which extends substantially orthogonal relative to the central axis 105 of valve lock 100.

As will be discussed further herein, retention assemblies 170 are configured to urge valve lock 100 into the locked configuration. As shown particularly in FIG. 5, in this exemplary embodiment, each retention assembly 170 generally includes an elongate member or retention pin 172, a biasing member 174, and an annular pin holder 176. The retention pin 172 of each retention assembly 170 extends through a central aperture of the pin holder 176 and is coupled to the outer surface 158 of a corresponding wedge 152. For example, the retention pin 172 may be threaded into a threaded aperture formed in the outer surface 157 of the wedge 152, however the mechanism by which the retention pin 172 is coupled to the corresponding wedge 152 may vary. The biasing member 174 of each retention assembly extends between the outer surface 158 of the corresponding wedge 152 and the pin holder 176. In this configuration, biasing member 174 exerts a radially inwards directed (relative central axis 105) force against the corresponding wedge 152, urging the wedge 152 towards the central axis 105 of valve lock 100. Additionally, the pin holder 176 is coupled to one of the apertures 146 formed in the outer housing 130 of housing assembly 102, thereby delimiting the radial travel of the retention pin 172 and the corresponding wedge 152 coupled thereto. While biasing members 174 are shown as comprising coil springs, in other embodiments, the configuration of biasing members 174 may vary.

In this configuration, each wedge 152 is permitted to travel radially between a radially inner position (shown in FIGS. 5, 6) and a radially outer position having a greater radius relative to the central axis 105 relative to the radially inner position. The radially inner positions of wedges 152 correspond to a radially inner configuration of collet assembly 150 while the radially outer positions of wedges 152 correspond to a radially outer configuration of the collet assembly 150. The radially inner positions of wedges 152 correspond to the locked configuration of valve lock 100 while the radially outer positions of wedges 152 correspond to the unlocked configuration of valve lock 100. As will be described further herein, wedges 152 may be actuated from their radially inner positions shown in FIGS. 5, 6 to their radially outer positions by piston assembly 180.

As shown particularly in FIG. 5, in this exemplary embodiment, piston assembly 180 has a central or longitudinal axis coaxial with central axis 105 of valve lock and generally includes an annular piston 182, a plurality of circumferentially spaced biasing assemblies 200, and an annular retention sleeve or mandrel 220. Given that piston assembly 180 extends coaxially with central axis 105, central axis 105 may also be referred to herein as the central axis 105 of piston assembly 180.

Piston 182 of piston assembly 180 generally includes a longitudinal first end 183, a longitudinal second end 184 opposite first end 183, a cylindrical outer surface 186 extending between ends 183, 184, and a central passage 185 extending between ends 183, 184 and which receives a terminal end 28 of the tail rod 26. In this exemplary embodiment, an annular seal assembly 188 (e.g., one or more O-rings or other type of annular seal) is positioned on the outer surface 186 of piston 182 and sealingly engages the inner surface 114 of the intermediate housing 110 of housing assembly 102. Additionally, outer surface 186 comprises an annular shoulder located axially between the first end 183 and the seal assembly 188 of piston 182. Seal assembly 188 defines a sealed piston chamber 191 within which hydraulic pressure may be applied against the shoulder of piston 182 to exert an axially directed, hydraulic pressure force against piston 182 in the direction of collet assembly 150. Piston chamber 191 may be in fluid communication with radial port 122 to thereby fluidically connect the piston chamber 191 with the unlocking hydraulic circuit 101 shown in FIGS. 1, 2 whereby control system 36 may selectably apply hydraulic pressure to the piston chamber 191 from pressurized hydraulic source 34.

In this exemplary embodiment, piston 182 includes a piston extension 192 defining the second end 184 of piston 182 and extending axially towards the collet assembly 150.

Piston extension 192 includes an annular, inclined engagement surface 194 which physically engages or contacts the plurality of wedges 152 of collet assembly 150. As will be described further herein, the inclined engagement surface 194 of piston extension 192 is configured to selectably displace the plurality of wedges 152 into their unlocked positions. Additionally, piston extension 192 includes a plurality of circumferentially spaced radial ports 196 extending therethrough.

Piston 182 may travel between a first or disengaged position (shown in FIG. 5) and a second or engaged position that is axially spaced from the disengaged position and which is configured to actuate the wedges 152 of collet assembly 150 into their unlocked positions. Piston 182 may be actuated from the disengaged position to the engaged position by applying hydraulic pressure to piston chamber 191. Fluid on the opposing side of shoulder 190 may be vented to the central passage 185 of piston 182 via radial ports 196. Conversely, biasing assemblies 200 are configured to urge the piston 182 towards the disengaged position and thus piston 182 may only be actuated from the disengaged position to the engaged position when the hydraulic pressure force applied to piston 182 exceeds the biasing force applied to piston 182 by biasing assemblies 200.

In this exemplary embodiment, each biasing assembly 200 comprises a support rod 202 and a biasing member 204 extending about the support rod 202 and between the piston 182 and the retention sleeve 220. The retention sleeve 220 is positioned about piston extension 192 of piston 182 and is secured between the intermediate housing 110 and outer housing 130 of housing assembly 102 whereby relative axial movement between retention sleeve 220 and housing assembly 102 is restricted. In this exemplary embodiment, retention sleeve 220 is captured between opposing shoulders of intermediate housing 110 and outer housing 130; however, in other embodiments, the manner of securing retention sleeve 220 to housing assembly 102 may vary. In still other embodiments, retention sleeve 220 may be formed integrally with housing assembly 102. In this exemplary embodiment, biasing members 204 contact both the retention sleeve 220 and piston 182 thereby imparting an axially directed biasing force to the piston 182 towards the disengaged position. While biasing members 204 are shown as comprising coil springs 204 in FIG. 5, in other embodiments, the configuration of biasing members 204 may vary.

Figure 8:
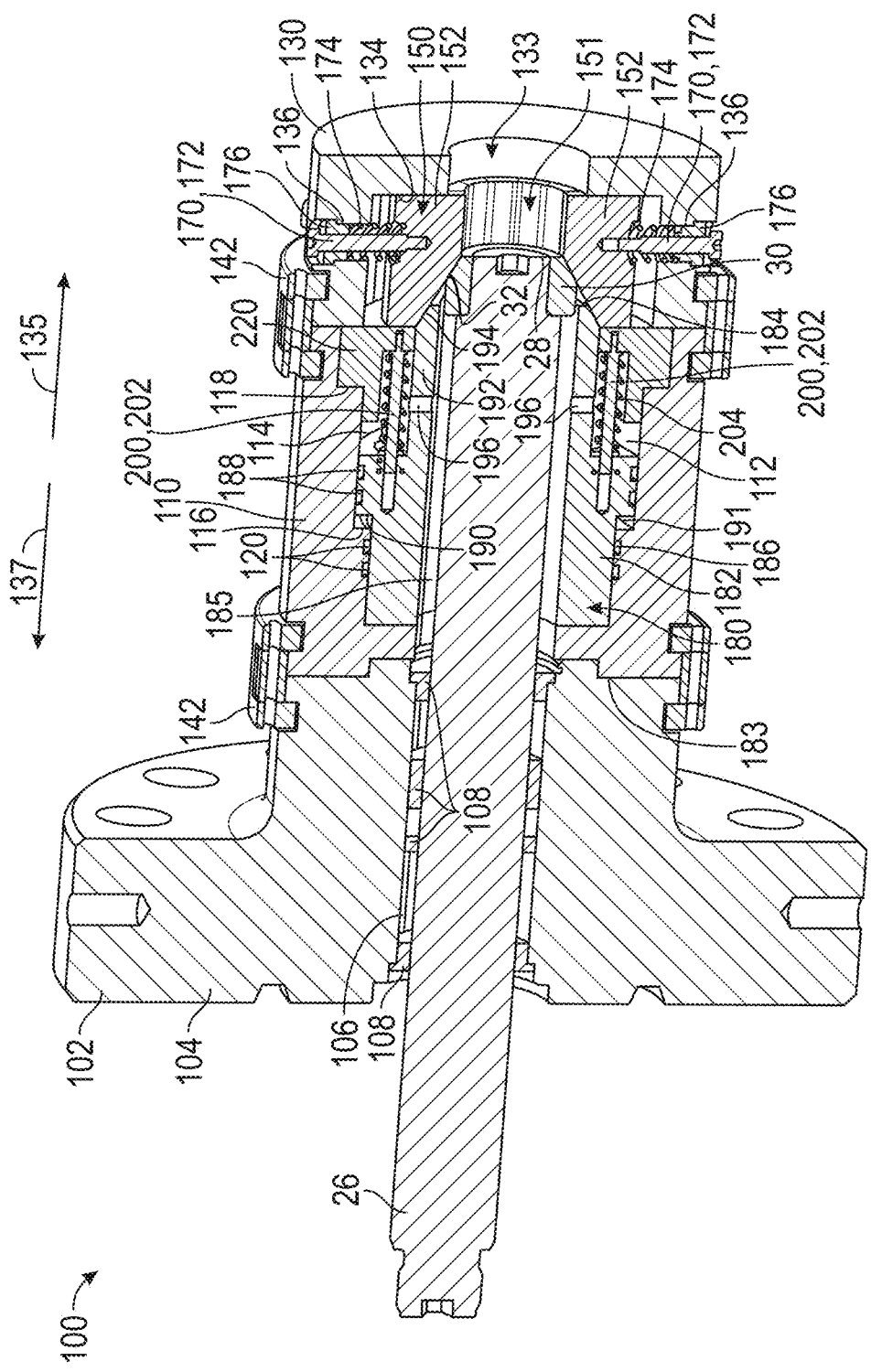
FIGS. 8-11 are side cross-sectional figures of the valve lock of FIG. 3 in different configurations.
Figure 9:
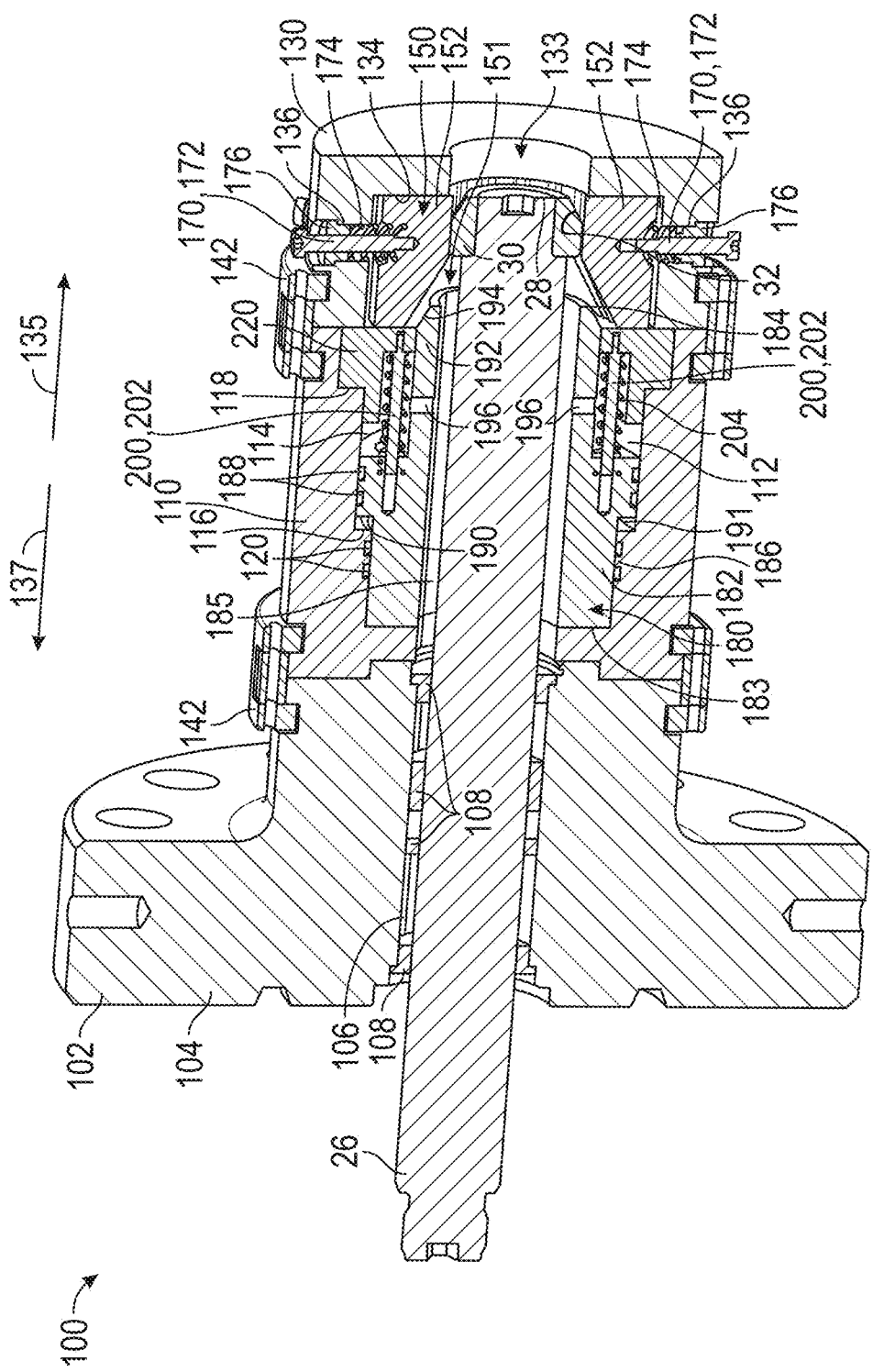

Referring now to FIGS. 8-11, having described the structure of the embodiment of valve lock 100 shown in FIGS. 3-7, an exemplary method of operating the valve lock 100 will now be described. Particularly, FIG. 8 illustrates tail rod 26 in a first position corresponding to the open configuration of valve system 10 shown in FIGS. 1, 2. In this position, an annular retainer 30 (e.g., a retainer nut or other radially enlarged member) coupled to the terminal end 28 of tail rod 26 is positioned adjacent the inclined surfaces 162 of the wedges 152 of collet assembly 150.

In this exemplary embodiment, when valve system 10 is actuated into the closed configuration the tail rod 26 is displaced axially in a first direction (indicated by arrow 135 in FIGS. 8-11) of the outer housing 130 of housing assembly 102. As tail rod 26 travels in the first direction 135, retainer 30 physically engages the inclined surface 162 of each wedge 152. Due to the acute angle formed between inclined surfaces 162 and central axis 105, the axial force applied to tail rod 26 to displace it along first direction 135 is transferred to wedges 152 as a radially outwards force causing wedges 152 to travel from a radially inwards position (shown in FIG. 8) to a radially outwards position (shown in FIG. 9) in a direction orthogonal central axis 105. While retention assemblies 170 urge wedges 152 towards their radially inner positions, the force from tail rod 26 exceeds the biasing forces applied to wedges 152, causing them to enter their radially outer positions shown in FIG. 9. Although in this exemplary embodiment the wedges 152 are biased towards their radially inner positions by retention assemblies 170, in other embodiments, a different mechanism may urge wedges 152 towards their radially inner positions. For example, a hydraulic locking circuit may be employed to actuate wedges 152 into their radially inner positions in response to pressurizing the locking circuit and applying a radially inwards directed pressure force against the wedges 152 of collet assembly 150.

Figure 10:
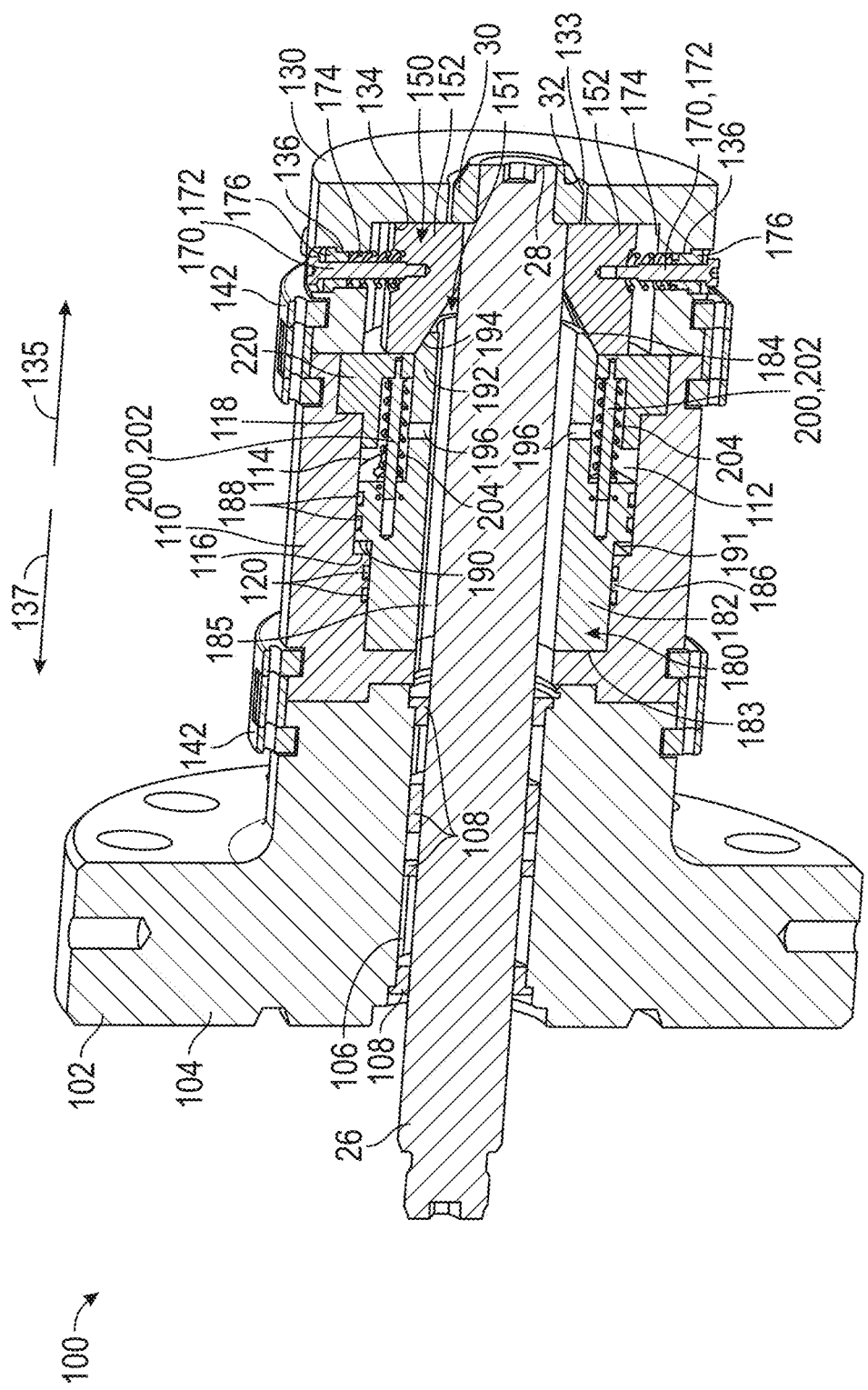

With wedges 152 in their radially outer positions, collet assembly 150 is disposed in an unlocked configuration which permits the retainer 30 of tail rod 26 to travel through the central passage 151 of collet assembly 150 such that retainer 30 occupies the central passage 133 of outer housing 130 as shown particularly in FIG. 10. With retainer 30 positioned in central passage 133 of outer housing 130 and external the central passage 151 of collet assembly 150, wedges 152 are forced again into their radially inner positions by the biasing forces applied by retention assemblies 170, as shown particularly in FIG. 10. In this manner, valve lock 100 is actuated from the unlocked configuration shown in FIG. 9 to the locked configuration shown in FIG. 10 automatically by retention assemblies 170 without the need to apply hydraulic pressure to an additional hydraulic circuit. Particularly, with wedges 152 returned to their radially inner positions, tail rod 26 is prevented from travelling in a second axial direction (indicated by arrow 137 in FIGS. 8-11) opposite first direction 135 due to contact between an annular shoulder 32 of retainer 30 and the second end 156 of each wedge 152. In other embodiments, the direction of travel of tail rod 26 corresponding to actuating valve system 10 from the open position to the closed position may be reversed from that shown in FIGS. 8-11.

Figure 11:
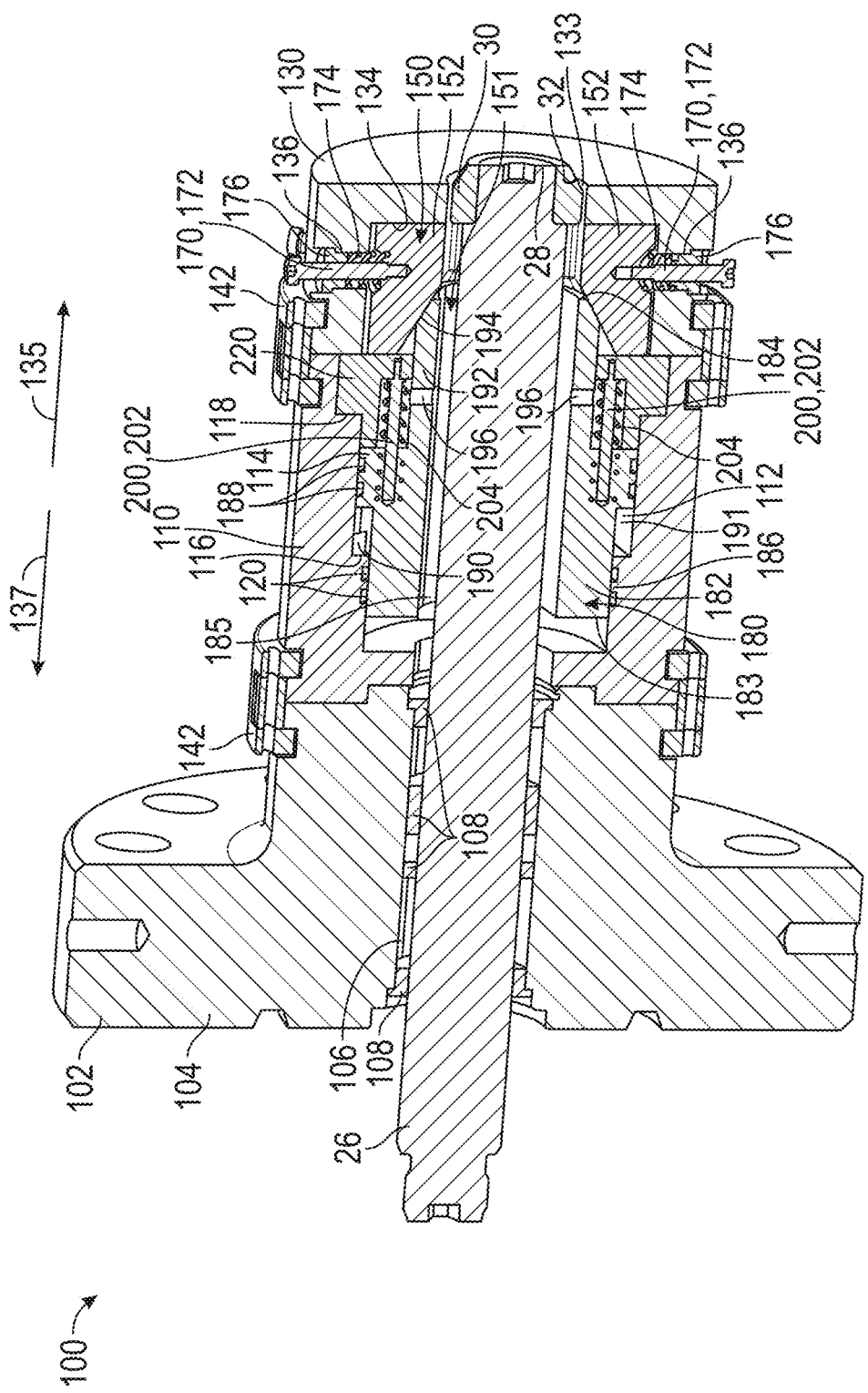

To reopen valve system 10, valve lock 100 may be actuated from the locked configuration shown in FIG. 10 to the unlocked configuration shown in FIG. 11. In this exemplary embodiment, valve lock 100 is actuated from the locked configuration to the unlocked configuration by applying hydraulic pressure from hydraulic source 34 to the piston chamber 191 of valve lock 100 via unlocking hydraulic circuit 101. Particularly, pressurizing piston chamber 191 exerts a hydraulic pressure force against piston 182 in the first direction 135 exceeding the biasing forces applied by biasing assemblies 200, thereby displacing piston 182 in the first direction 135. As piston 182 travels in the first direction 135, the inclined engagement surface 194 of piston extension 192 engages the inclined surface 162 of each wedge 152 of collet assembly 150, thereby forcing each wedge 152 back into its radially outer position. With each wedge 152 in the radially outer position, tail rod 26 is free to return to the first position corresponding to the open configuration of valve system 10 in response to the pressurizing of opening hydraulic circuit 30 of valve system 10. In this manner, valve lock 100 may be selectably unlocked by an operator of valve system 10 (preventing an inadvertent unlocking of valve lock 100) first before the valve system 10 is permitted to actuate into the open configuration.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A valve lock for a linear valve system, comprising:
   a housing comprising a passage configured to receive a rod of a linearly extendable valve member of the linear valve system; and
   a collet assembly received in the housing and comprising a collet shoulder, wherein the collet assembly has a central axis extending parallel the rod of the valve member, a radially inner configuration with respect to the central axis of the collet assembly, and a radially outer configuration relative to the central axis of the collet assembly;
   wherein the lock comprises an unlocked configuration associated with the radially outer configuration of the collet assembly and in which a terminal end of the rod is located in a first axial direction relative to the collet shoulder of the collet assembly, and a locked configuration associated with the radially inner configuration of the collet assembly and in which the terminal end of the rod is located in an opposing second axial direction relative to the collet shoulder whereby the collet assembly locks against the rod of the valve member to prevent the rod from travelling in at least one axial direction.

2. The valve lock of claim 1, further comprising a piston assembly received in the housing and configured to actuate the collet assembly into the radially outer configuration.

3. The valve lock of claim 2, wherein the piston assembly comprises a piston comprising a first position in the housing and a second position in the housing axially spaced from the first position, wherein the first position of the piston corresponds to the locked configuration of the collet assembly while the second position of the piston corresponds to the unlocked configuration of the collet assembly.

4. The valve lock of claim 3, wherein the piston assembly comprises a biasing member configured to bias the piston towards the first position, and a piston chamber configured to receive pressurized hydraulic fluid thereby forcing the piston into the second position.

5. The valve lock of claim 1, wherein the collet assembly comprises a plurality of wedges spaced circumferentially about the central axis of the collet assembly, wherein each wedge comprises a radially inner position corresponding to the radially inner configuration of the collet assembly and a radially outer position corresponding to the radially outer configuration of the collet assembly.

6. The valve lock of claim 5, wherein each of the wedges comprises an inclined engagement surface positioned at an acute angle relative to the central axis of the collet assembly.

7. A valve system comprising the valve lock of claim 1, wherein the valve system comprises an open configuration corresponding to a first axial position of the valve member and a closed configuration corresponding to a separate second axial position of the valve member, and wherein the valve lock is configured to lock the valve system into the closed configuration.

8. A valve lock for a linear valve system, comprising:
a housing comprising a passage configured to receive a rod of a linearly extendable valve member of the linear valve system; and
a collet assembly received in the housing, wherein the collet assembly comprises a plurality of circumferentially spaced wedges each having a radially inner position relative to a central axis of the lock, and a radially outer position relative to the lock spaced linearly along a radial axis extending orthogonal the central axis of the lock from the radially inner position;
wherein the lock comprises an unlocked configuration associated with the radially outer positions of the wedges of the collet assembly, and a locked configuration associated with the radially inner positions of the wedges of the collet assembly and which locks against the rod of the valve member and thereby prevent the rod from travelling in at least one axial direction.

9. The valve lock of claim 8, further comprising a piston assembly received in the housing and configured to actuate the wedges of the collet assembly into their radially outer positions.

10. The valve lock of claim 9, wherein the valve system comprises an open configuration corresponding to a first axial position of the valve member and a closed configuration corresponding to a separate second axial position of the valve member, and wherein the valve lock is configured to lock the valve system into the closed configuration.

11. The valve lock of claim 8, wherein each of the wedges comprises an inclined engagement surface positioned at an acute angle relative to the central axis of the collet assembly.

12. The valve lock of claim 8, wherein each of the wedges comprises a shoulder configured to physically engage a retainer of the rod of the valve member whereby relative axial movement between the plurality of wedges and the rod of the valve member in the at least one axial direction is restricted.

13. The valve lock of claim 8, further comprising a plurality of biasing members configured to urge the plurality of wedges towards their radially inner positions.

14. A valve system comprising the valve lock of claim 8, wherein the valve system comprises an open configuration corresponding to a first axial position of the valve member and a closed configuration corresponding to a separate second axial position of the valve member, and wherein the valve lock is configured to lock the valve system into the closed configuration.

15. A valve lock for a linear valve system, comprising:
a housing comprising a passage configured to receive a rod of a linearly extendable valve member of the linear valve system;
a collet assembly received in the housing and comprising a collet shoulder, wherein the collet assembly has a central axis extending parallel the rod of the valve member, a first configuration with respect to the central axis of the collet assembly in which the collet shoulder occupies a radially inner position, and a second configuration relative to the central axis of the collet assembly in which the collet shoulder occupies a radially outer position spaced linearly along a radial axis extending orthogonal the central axis of the collet assembly from the radially inner position, and wherein the collet assembly is configurated to actuate from the first configuration to the second configuration in response to physical engagement between the rod of the valve member and the collet assembly; and
a piston assembly received in the housing and configured to actuate the collet assembly into the second configuration;
wherein the lock comprises an unlocked configuration associated with the second configuration of the collet assembly, and a locked configuration associated with the first configuration of the collet assembly and which locks against the rod of the valve member and thereby prevent the rod from travelling in at least one axial direction.

16. The valve lock of claim 15, wherein the piston assembly comprises a piston comprising a first position in the housing and a second position in the housing axially spaced from the first position, wherein the first position of the piston corresponds to the first configuration of the collet assembly while the second position of the piston corresponds to the second configuration of the collet assembly.

17. The valve lock of claim 15, wherein the collet assembly comprises a plurality of wedges spaced circumferentially about the central axis of the collet assembly, wherein each wedge comprises a radially inner position corresponding to the first configuration of the collet assembly and a radially outer position corresponding to the second configuration of the collet assembly.

18. The valve lock of claim 17, wherein each of the wedges comprises an inclined engagement surface positioned at an acute angle relative to the central axis of the collet assembly.

19. The valve lock of claim 17, wherein each of the wedges comprises the collet shoulder configured to physically engage a retainer of the rod of the valve member whereby relative axial movement between the plurality of wedges and the rod of the valve member in the at least one axial direction is restricted.

20. A valve system comprising the valve lock of claim 15, wherein the valve system comprises an open configuration corresponding to a first axial position of the valve member and a closed configuration corresponding to a separate second axial position of the valve member, and wherein the valve lock is configured to lock the valve system into the closed configuration.

* * * * *